(12) United States Patent
Lin

(10) Patent No.: US 12,298,991 B2
(45) Date of Patent: May 13, 2025

(54) INFORMATION ACQUISITION METHOD AND APPARATUS, GRAPHIC CODE GENERATION METHOD AND APPARATUS, TERMINAL, AND MEDIUM

(71) Applicant: TENCENT TECHNOLOGY (SHENZHEN) COMPANY LIMITED, Shenzhen (CN)

(72) Inventor: Zhiyuan Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/213,590

(22) Filed: Jun. 23, 2023

(65) Prior Publication Data
US 2023/0334060 A1  Oct. 19, 2023

Related U.S. Application Data

(63) Continuation of application No. PCT/CN2022/127894, filed on Oct. 27, 2022.

(30) Foreign Application Priority Data
Jan. 6, 2022 (CN) .......................... 202210011351.7

(51) Int. Cl.
G06F 16/248 (2019.01)
G06F 16/2457 (2019.01)
G06K 7/14 (2006.01)

(52) U.S. Cl.
CPC ...... G06F 16/248 (2019.01); G06F 16/24578 (2019.01); G06K 7/1417 (2013.01)

(58) Field of Classification Search
CPC ............ G06F 16/24578; G06F 16/248; G06F 16/9532; G06F 16/9554
(Continued)

(56) References Cited

U.S. PATENT DOCUMENTS 11,431,834 B1 *  8/2022  Gordon .................. G06F 21/32
11,463,576 B1 * 10/2022  Gordon ................. G06F 3/0482
(Continued)

FOREIGN PATENT DOCUMENTS

CN        104731465 A      6/2015
CN        105760522 A      7/2016
(Continued)

OTHER PUBLICATIONS

The World Intellectual Property Organization (WIPO) International Search Report for PCT/CN2022/127894 Jan. 11, 2023 6 Pages (including translation).

(Continued)

Primary Examiner — Hung T Vy
(74) Attorney, Agent, or Firm — ANOVA LAW GROUP, PLLC

(57) ABSTRACT

An information acquisition method includes displaying a code scanning interface, performing a code scanning operation on a target graphic code of a first provider based on the code scanning interface, the target graphic code being configured to trigger a search based on a keyword; and displaying a first search result associated with a first provider and a second search result associated with at least one second provider in a search results page for the keyword.

20 Claims, 7 Drawing Sheets

(58) Field of Classification Search
USPC .......................................................... 707/727
See application file for complete search history.

(56) References Cited

U.S. PATENT DOCUMENTS

| | | |
|---|---|---|
| 2007/0100709 A1 | 5/2007 | Lee et al. |
| 2020/0097692 A1 | 3/2020 | Tu |
| 2022/0179665 A1* | 6/2022 | Rathod .................. G06F 9/451 |

FOREIGN PATENT DOCUMENTS

| | | |
|---|---|---|
| CN | 105808750 A | 7/2016 |
| CN | 106557225 A | 4/2017 |
| CN | 107193835 A | 9/2017 |
| CN | 107590522 A | 1/2018 |
| CN | 111695051 A | 9/2020 |
| CN | 113553521 A | 10/2021 |
| JP | 2004038889 A | 2/2004 |
| JP | 2018190059 A | 11/2018 |
| WO | 2018104834 A1 | 6/2018 |

OTHER PUBLICATIONS

The State Intellectual Property Office of the People's Republic of China (SIPO) Office Action 1 for 202210011351.7 May 28, 2024 11 Pages (including translation).
China National Intellectual Property Administration (CNIPA) Office Action 1 for Application No. 202210011351.7 Aug. 24, 2024 14 Pages (including translation).
The Japan Patent Office (JPO) Notice of Reasons for Refusal for Application No. 2024-523107 Dec. 25, 2024 7 Pages (including translation).

* cited by examiner

| Looking for a babysitter | Cancel |

XX Domestic Service

XX Domestic Service, the family life service platform around you, providing high...

Looking for a babysitter
Professional Housekeeping
Delicious Cooking

YY All Way Service

YY All Way Service was established in 2015, providing high-quality...

Looking for a babysitter
Looking for a babysitter quickly

ZZ Domestic Service Network
ZZ Domestic service, providing professional babysitter services More
∨

FIG. 5

INFORMATION ACQUISITION METHOD AND APPARATUS, GRAPHIC CODE GENERATION METHOD AND APPARATUS, TERMINAL, AND MEDIUM

CROSS-REFERENCES TO RELATED APPLICATIONS

This application is a continuation application of PCT Patent Application No. PCT/CN2022/127894, filed on Oct. 27, 2022, which claims priority to Chinese Patent Application No. 202210011351.7, entitled "INFORMATION ACQUISITION METHOD AND APPARATUS, GRAPHIC CODE GENERATION METHOD AND APPARATUS, TERMINAL, AND MEDIUM" filed on Jan. 6, 2022, the entire contents of both of which are incorporated herein by reference.

FIELD OF THE TECHNOLOGY

The present disclosure relates to the field of Internet technologies, and in particular, to an information acquisition method and apparatus, a graphic code generation method and apparatus, a terminal, and a medium.

BACKGROUND

The development of Internet technologies brings various conveniences to people's daily life. For example, people can enjoy services such as shopping, ordering food, paying electricity bills, and booking tickets without leaving home.

SUMMARY

Embodiments of the present disclosure provide an information acquisition method, a graphic code generation method, an apparatus, a device, and a medium.

According to one aspect, an information acquisition method is provided. The method includes: displaying a code scanning interface; performing a code scanning operation on a target graphic code of a first provider based on the code scanning interface, the target graphic code being configured to trigger a search based on a keyword; and displaying a first search result associated with a first provider and a second search result associated with at least one second provider in a search results page, the second provider being used for providing an object corresponding to the keyword.

According to another aspect, a graphic code generation method is provided. The method includes: displaying a first page, the first page including information of a first provider; displaying a second page in response to a trigger operation on a first control in the first page, the second page being configured to facilitate generation of a graphic code; and displaying a target graphic code of the first provider generated based on a keyword inputted in the second page, the target graphic code being configured to trigger a search based on the keyword.

According to another aspect, an information acquisition apparatus is provided. The apparatus includes: a display module, configured to display a code scanning interface; and a code scanning module, configured to perform a code scanning operation on a target graphic code of a first provider based on the code scanning interface, the target graphic code being configured to trigger a search based on a keyword, the display module being further configured to display a first search result associated with a first provider and a second search result associated with at least one second provider in a search results page, and the second provider being used for providing an object corresponding to the keyword.

According to another aspect, a graphic code generation apparatus is provided. The apparatus includes a display module, configured to display a first page, the first page including information of a first provider, the display module being further configured to display a second page in response to a trigger operation on a first control in the first page, the second page being configured to facilitate generation of a graphic code; and the display module being further configured to display a target graphic code of the first provider, the target graphic code being generated based on a keyword inputted on the second page, and the target graphic code being configured to trigger a search based on the keyword.

According to another aspect, a terminal is provided. The terminal includes at least one processor and at least one memory, the at least one memory being configured to store at least one computer program, and the at least one computer program being loaded and executed by the at least one processor to implement the information acquisition method or the graphic code generation method in the embodiments of the present disclosure.

According to another aspect, a non-transitory computer-readable storage medium is provided. The computer-readable storage medium stores at least one computer program, the at least one computer program being loaded and executed by a processor to implement the information acquisition method or the graphic code generation method in the embodiments of the present disclosure.

BRIEF DESCRIPTION OF THE DRAWINGS

FIG. 5 is a schematic diagram of a search results page according to an embodiment of the present disclosure.

DESCRIPTION OF EMBODIMENTS

To make the objectives, technical solutions, and advantages of the present disclosure clearer, implementations of the present disclosure are further described below in detail with reference to the accompanying drawings.

The terms "first", "second", and the like in the present disclosure are used for distinguishing between same items or similar items of which effects and functions are basically the same. It should be understood that, the "first", "second", and "nth" do not have a dependency relationship in logic or time sequence, and a quantity and an execution order thereof are not limited.

In the present disclosure, the term "at least one" means one or more, and "a plurality of" means two or more.

In the embodiments of the present disclosure, relevant data such as provider information, user account, account attribute information, historical search information, and search results are involved. When the present disclosure is applied to products or technologies, permission or consent is required, and the collection, use, and processing of relevant data need to comply with the relevant laws, regulations, and standards of relevant countries and regions.

With the development of Internet technologies, people can enjoy services such as shopping, ordering food, paying electricity bills, and booking tickets without leaving home. Using shopping as an example, first a provider of shopping services needs to be selected, and then a search box needs to be found in a shopping program of the provider to enter a keyword in the search box to obtain search results associated with the keyword. Obviously, the above process requires complex steps to find items to be purchased, and the efficiency of information acquisition is low.

Terms involved in the present disclosure are explained below:

Provider refers to an information carrier that provides content such as services, items, articles, and videos. For example, the information carrier is a merchant, an official account, or a website.

ID (Identity document) refers to identification information such as an identification number, an account, a unique code, and an exclusive number.

URL (Uniform Resource Locater) refers to a uniform resource location identifier of World Wide Web, that is, a network address, Logo (Logotype) plays the role of identifying a company with a Logo, and consumers can remember the main body of the company through the image of the Logo.

API (Application Programming Interface) refers to some predefined interfaces (such as functions or HTTP interfaces), or refers to a contract of connecting different components of a software system.

An implementation environment of the present disclosure is described below.

Figure 1:
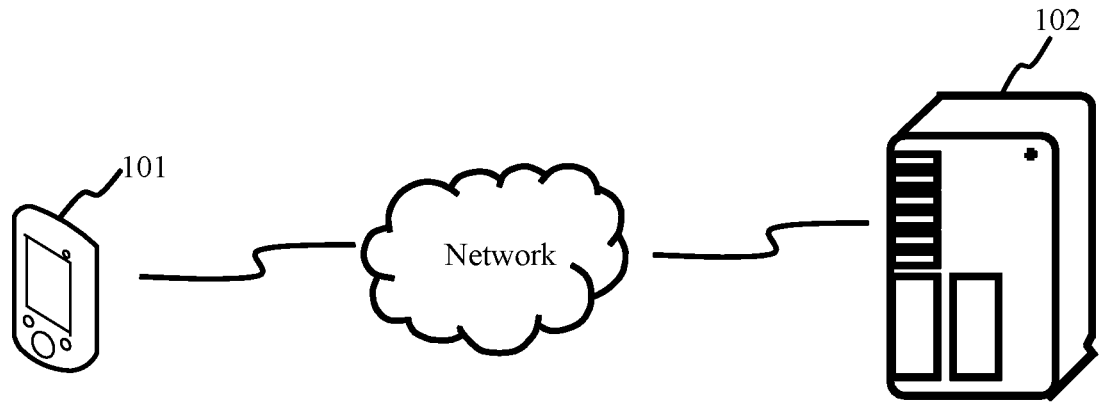
FIG. 1 is a schematic diagram of an implementation environment of an information acquisition method according to an embodiment of the present disclosure.

An information acquisition method provided in an embodiment of the present disclosure is implemented by a terminal. An implementation environment of the information acquisition method provided in this embodiment of the present disclosure is described below. FIG. 1 is a schematic diagram of an implementation environment of an information acquisition method according to an embodiment of the present disclosure. Referring to FIG. 1, the implementation environment includes a terminal 101 and a server 102. The terminal 101 and the server 102 are directly or indirectly connected in a wired or wireless communication manner, and are not limited in the present disclosure.

In some embodiments, the terminal 101 is a smartphone, a tablet computer, a notebook computer, a desktop computer, a smart voice interaction device, a smart household appliance, or a vehicle terminal, but is not limited thereto. An application supporting code scanning is installed and run on the terminal 101. The application is any one of a social application, a shopping application, or an information application. For example, the terminal 101 is a terminal used by a user, and the terminal 101 is logged in with a user account. The user scans a target graphic code through the application supporting code scanning in the terminal 101, to obtain search results. A person skilled in the art learns that more or less terminals may be provided. For example, one terminal may be provided, or dozens or hundreds of or more terminals may be provided. The quantity and the device type of the terminals are not limited in the embodiments of the present disclosure.

For example, using the application supporting code scanning being a social application as an example, the terminal 101 displays a code scanning interface of the application, and then performs a code scanning operation on a target graphic code of a first provider based on the code scanning interface to trigger a search based on a keyword, where the target graphic code is a graphic code displayed by an electronic device, a graphic code printed on a printed matter, or the like. The terminal 101 then displays search results returned by the server 102 on a search results page for the keyword. In the above process, the search results can be obtained by only scanning the target graphic code, and the operation is simple and convenient, thereby improving the efficiency of information acquisition.

In some embodiments, the server 102 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a CDN (Content Delivery Network), big data, and an artificial intelligence platform. The server 102 is configured to provide a backend service to the application supporting code scanning. In some embodiments, the server 102 is in charge of primary computing work, and the terminal 101 is in charge of secondary computing work; or the server 102 is in charge of secondary computing work, and the terminal 101 is in charge of primary computing work; or a distributed computing architecture is used between the server 102 and the terminal 101 to perform collaborative computing.

Figure 2:
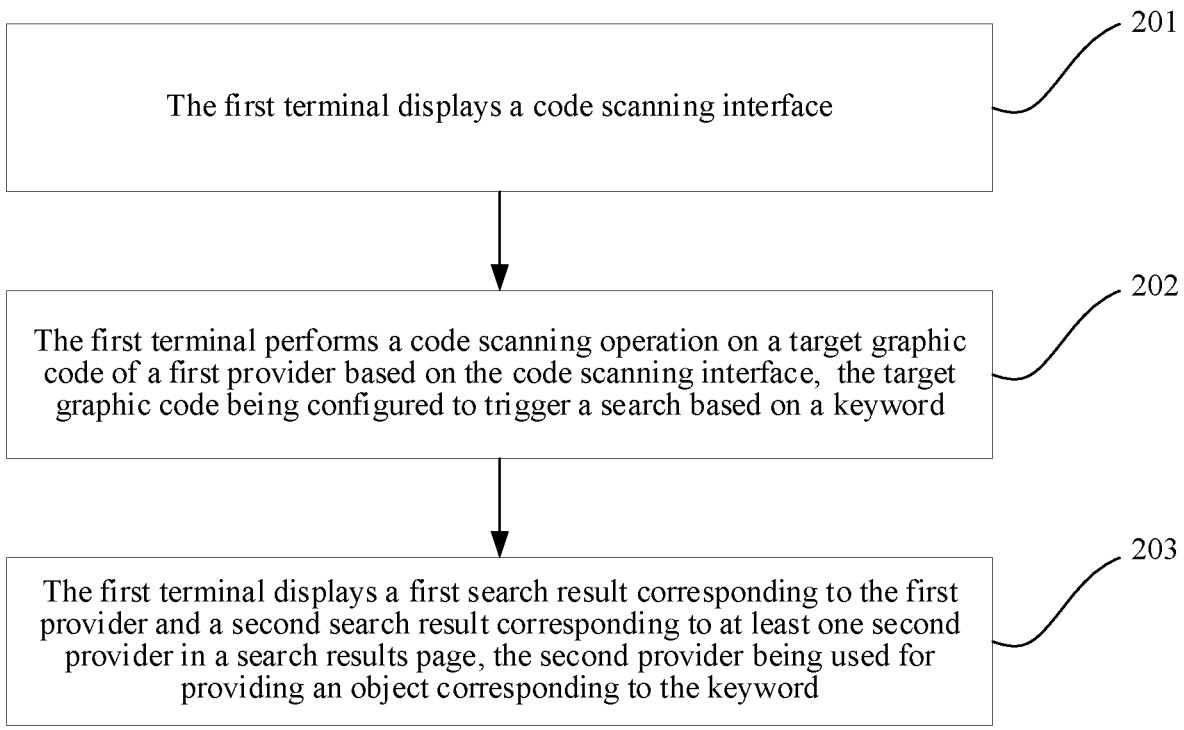
FIG. 2 is a flowchart of an information acquisition method according to an embodiment of the present disclosure.

FIG. 2 is a flowchart of an information acquisition method according to an embodiment of the present disclosure. Referring to FIG. 2, the method being performed by a first terminal is used as an example for description in this embodiment of the present disclosure. The information acquisition method includes the following steps:

201. The first terminal displays a code scanning interface.

In this embodiment of the present disclosure, the first terminal is the terminal 101 in FIG. 1. The first terminal is installed with an application capable of implementing a code scanning function. In response to a trigger operation on the code scanning function, the first terminal displays the code scanning interface of the application.

202. The first terminal performs a code scanning operation on a target graphic code of a first provider based on the code scanning interface, the target graphic code being configured to trigger a search based on a keyword.

In this embodiment of the present disclosure, the first provider is used for providing an object associated with the keyword, the first provider may be any one of an official account, an applet, a webpage, or a virtual shop, and the object may be any one of a service, an item, or a multimedia resource. The target graphic code is a graphic code displayed on an electronic device or a graphic code printed on a printed matter, and the target graphic code is a graphic code capable of containing information such as a barcode, a QR code, or an applet code. This is not limited in the embodiments of the present disclosure. The first terminal can call a camera to shoot the target graphic code and display content shot by the camera in the code scanning interface, thereby implementing the code scanning operation on the target graphic code.

For example, the target graphic code is an applet code displayed on a webpage, or the target graphic code is a QR code printed on a leaflet or poster. By triggering a code scanning control in a chat program of the first terminal, the code scanning function can be called to perform the code scanning operation on the above applet code or QR code.

203. The first terminal displays a first search result corresponding to the first provider and a second search result corresponding to at least one second provider in a search results page, the second provider being used for providing an object corresponding to the keyword.

In this embodiment of the present disclosure, after performing the code scanning operation, the first terminal can trigger a search based on a keyword, that is, the server performs a search based on the keyword and the first terminal receives search results of the keyword returned by the server. The first terminal then displays a search results page for the keyword, and displays search results returned by the server in the search results page. The search results include a first search result and at least one second search result, and the first search result is associated with the first provider and the at least one second search result is associated with at least one second provider respectively. The second provider is used for providing an object associated with the keyword. An information type of the first search result and the at least one second search result is an entry to an official account, an entry to an applet, a link to a webpage, a link to a multimedia resource, or the like. This is not limited in the embodiments of the present disclosure.

According to the technical solutions provided in the present disclosure, the search based on the keyword is triggered by performing the code scanning operation on the target graphic code, so that the second search result of the at least one second provider providing the object associated with the keywords can be found and the first search result of the first provider can also be found. The search results can be obtained by only scanning the target graphic code, and the operation is simple and convenient, thereby improving the efficiency of information acquisition.

Figure 3:
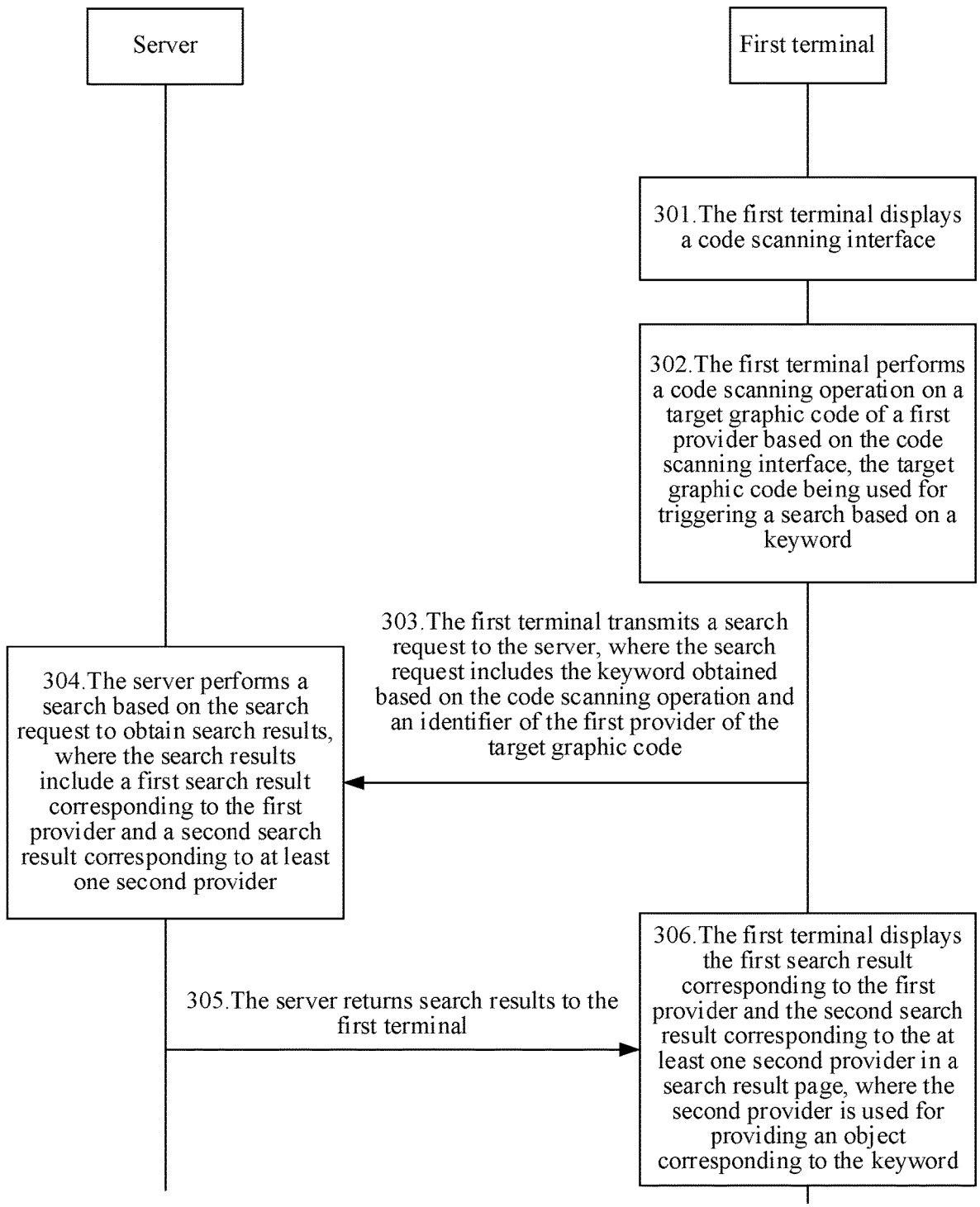
FIG. 3 is an interactive flowchart of an information acquisition method according to an embodiment of the present disclosure.

FIG. 3 is an interactive flowchart of an information acquisition method according to an embodiment of the present disclosure. Referring to FIG. 3, interaction between a first terminal and a server is used as an example for description in this embodiment of the present disclosure. The information acquisition method includes the following steps:

301. The first terminal displays a code scanning interface.

In this embodiment of the present disclosure, the first terminal is installed with a chat program supporting code scanning and searching, and the first terminal displays a code scanning page in response to a trigger operation of a code scanning control in the chat program, where the code scanning page includes a viewfinder frame. The first terminal can aim a target graphic code to be scanned with the viewfinder frame in the code scanning page, to scan and identify the target graphic code in the viewfinder frame, to implement the code scanning operation on the target graphic code.

302. The first terminal performs a code scanning operation on a target graphic code of a first provider based on the code scanning interface, the target graphic code being configured to trigger a search based on a keyword.

In this embodiment of the present disclosure, the first provider is used for providing an object associated with the keyword, the first provider may be any one of an official account, an applet, a webpage, or a virtual shop, and the object may be any one of a service, an item, or a multimedia resource. The target graphic code is created by the first provider, and the target graphic code includes any one of a barcode, a QR code, or an applet code, that is, a graphic code capable of containing information belongs to the target graphic code. The graphic code is used for carrying information for searching, so that a search function can be called based on the code scanning function, to improve the search efficiency.

Figure 4:
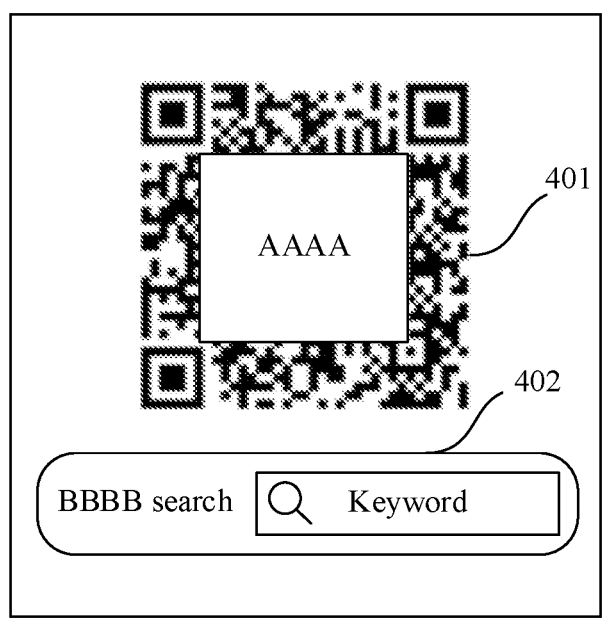
FIG. 4 is a schematic diagram of a target graphic code according to an embodiment of the present disclosure.

For example, the target graphic code is a QR code printed on an object such as paper, and a non-recognized area of the QR code displays a picture or text, such as a logo of a merchant, a name of a merchant, a keyword included in the QR code, or the like. In addition to the QR code, the object further includes an indication image or indication information indicating a type of an application used for code scanning. FIG. 4 is a schematic diagram of a target graphic code according to an embodiment of the present disclosure. FIG. 4 exemplarily shows an object surface printed with a QR code, and the object surface includes both a QR code 401 and an indication image 402 of an application. A non-recognized area of the QR code 401 displays a name AAAA of a merchant and the indication image 402 displays a name BBBB of an application.

303. The first terminal transmits a search request to the server, where the search request includes the keyword obtained based on the code scanning operation and an identifier of the first provider of the target graphic code.

In this embodiment of the present disclosure, the first terminal can scan and identify the target graphic code by performing the code scanning operation on the target graphic code, and obtain the keyword included in the target graphic code and the identifier of the first provider. The identifier is an ID, a URL, or the like, and is not limited in the embodiments of the present disclosure. After obtaining the keyword and the identifier, the first terminal transmits a search request to the server so that the server performs a search based on the keyword and returns search results.

For example, the first provider is an official account providing housekeeping services: XX Domestic Service. The target graphic code includes a keyword "looking for a babysitter" and an official account ID of the XX Domestic Service. The first terminal performs the code scanning operation on the target graphic code to obtain the keyword "looking for a babysitter" and the identifier of the first provider, that is, the official account ID, and then generates a search request including "looking for a babysitter" and the official account ID, and transmits the search request to the server.

In some embodiments, the target graphic code further includes a search identifier, and the search identifier is used for instructing the first terminal to invoke a search-related service, thereby generating a search request. For example, the search identifier is a binary string. Different services, such as such as a jump service, a payment service, and a login service, have different binary strings. After scanning the target graphic code, the first terminal can determine a to-be-called service through the binary string included in the target graphic code, thereby calling an API providing the service.

304. The server performs a search based on the search request to obtain search results, where the search results include a first search result corresponding to the first provider and a second search result corresponding to at least one second provider.

In this embodiment of the present disclosure, after receiving the search request, the server can parse the search request to obtain the keyword and the identifier of the first provider. The server then performs a search based on the keyword and the identifier of the first provider to obtain the search results. In some embodiments, the server performs a search based on the keyword to obtain a plurality of search results, and the plurality of search results include a first search result and at least one second search result. In some other embodiments, the server performs a search based on the identifier of the first provider to obtain a first search result and performs a search based on the keyword to obtain at least one second search result. In some other embodiments, the server determines a type of the first provider based on the identifier of the first provider, and then searches for the type of the first provider, so that the second provider and the first provider belong to the same type. This search process is called a vertical search, and the vertical search includes an official account search, a service search, an applet search, a webpage search, and other searches. The search results obtained by the server include at least one of an entry to an official account, an entry to an object associated with the keyword in the official account, an entry to an applet, a link to a multimedia resource, or a link to a webpage, and are not limited in the embodiments of the present disclosure. By performing a search based on the keyword, content related to the keyword can be obtained, the search range is wide, and the search efficiency is high.

For example, the server performs a search based on the keyword "looking for a babysitter", and finds a plurality of official accounts providing a nanny service. For any official account, the server determines a service page directly related to the nanny service from the official account, and then uses an entry to the official account and an entry to the service page as a search result.

In some embodiments, the server can further rank the search results. For example, the server filters out a first search result associated with the first provider from the search results according to the identifier of the first provider. Then the server determines at least one remaining search result as a second search result associated with at least one second provider, and the second provider corresponds to the second search result one by one. The server adjusts the first search result to the first place of the search results. Then the server returns the search results to the first terminal in a form of a list. The server can further adjust the first search result to other positions, such as the second place, the third place, or the fourth place, to ensure that the first search result is ranked in the front position. This is not limited in the embodiments of the present disclosure. After the providers access a code scanning search function, the rank of the providers in the search results page can be increased by ranking the first search result in the front position, so that both service providers and service users are benefited, forming a virtuous circle.

In some embodiments, the server can further rank the second search result based on a display priority of the second provider, so that the second search result associated with the second provider with a higher display priority is ranked ahead of the second search result associated with the second provider with a lower display priority. The display priority is determined based on an exposure rate, a click-through rate, a favorable rate, and the like of the second provider. This is not limited in the embodiments of the present disclosure.

In some embodiments, the server can further separately determine a similarity between the at least one second provider and the first provider, and then rank the second search result based on the degree of the similarity, so that the second search result associated with the second provider with a high similarity is ranked ahead of the second search result associated with the second provider with a low similarity. The similarity is determined by the server based on the objects provided by the first provider and the second provider, or by the server based on the types of the first provider and the second provider. The method for determining the similarity is not limited in the embodiments of the present disclosure.

In some embodiments, the server can further rank the second search result based on account attribute information of an account logged in to the first terminal, so that the second search result of the second provider belonging to a target type is ranked ahead of the second search result of the second provider not belonging to the target type. The target type refers to the type of the provider matching the account indicated in the account attribute information, for example, the target type refers to a preferred type of the account. The server acquires the account attribute information of the account, and the account attribute information indicates a type of a provider matching the account. In an example, the account attribute information is usage preference information, and the usage preference information indicates a type of a preferred provider of the account. The account is an account currently logged in to the first terminal, and the search request carries an account identifier of the account. In some embodiments, the usage preference information is determined by the server based on usage behaviors of services provided by for the providers based on the account. This is not limited in the embodiments of the present disclosure. For example, if the account has accessed many services in official accounts, but has less access to services in an applet, it indicates that the type of the preferred provider of the account is the official account type.

In some embodiments, the server can further rank the second search result based on historical search information of an account logged in to the first terminal, where the historical search information indicates a type of a provider associated with a search behavior of the account within a historical period, so that the second search result associated with the second provider conforming to the historical search behavior of the account is ranked ahead of the second search result associated with the second provider not conforming to the historical search behavior of the account. The historical search information is determined by the server based on the behaviors of searching for the providers in the historical search record based on the account. This is not limited in the embodiments of the present disclosure. If the account has performed many searches for official accounts, but has performed less or no searches for applets, it indicates that the type of the provider associated with the historical search behavior of the account within the historical period is the official account type.

In some embodiments, the at least one second provider and the first provider belong to the same type, where the type includes an official account type, an applet type, a webpage type, or the like. The server can further determine the type of the first provider based on the identifier of the first provider, and then obtain a third search result associated with at least one third provider based on the keyword according to the type of the first provider, where the third provider belongs to a different type from the first provider. By searching for the third provider belonging to a different type from the first provider based on the keyword, the search range can be expanded and the diversity of the search results can be improved. For example, if the type of the first provider is an official account, the type of the third provider is an applet type or a webpage type.

305. The server returns the search results to the first terminal.

In this embodiment of the present disclosure, the server can return the search results found based on step 304 to the first terminal. The search results are search results ranked by the server or search results not ranked by the server.

306. The first terminal displays the first search result corresponding to the first provider and the second search result corresponding to the at least one second provider in a search results page.

In this embodiment of the present disclosure, the first terminal displays the search results page for the keyword, and displays the search results returned by the server in the search results page. The search results include at least one of an entry to an official account, an entry to an object corresponding to the keyword in the official account, an entry to an applet, a link to a multimedia resource, or a link to a webpage, and are not limited in the embodiments of the present disclosure. When displaying the search results, the first terminal displays the search results out of order, or displays the search results based on a specified order. The display order of the search results is set by the server or the first terminal.

In some embodiments, the first terminal pins the first search result associated with the first provider at the top in the search results page. By displaying the first search result associated with the first provider at the top, the exposure rate and the click-through rate of the first provider can be improved.

In some embodiments, the first terminal displays the second search result associated with the at least one second provider in the search results page based on a display priority of the at least one second provider. The display priority is determined based on parameters such as an exposure rate, a click-through rate, and a favorable rate of the second provider. This is not limited in the embodiments of the present disclosure. By displaying the second search result associated with the second provider based on the display priority, the quality of the second search result ranked ahead is superior to the quality of the second search result ranked behind, thereby improving the efficiency of obtaining the search results.

In some embodiments, the first terminal displays the second search result associated with the at least one second provider in the search results page based on a similarity between the at least one second provider and the first provider. The first terminal ranks the second search result in the same way as the server. Refer to step 303 above and this is not repeated herein. For example, each second search result is displayed in descending order according to the similarity of the associated second provider and the first provider, to ensure that the second search result more similar to the first search result associated with the first provider is ranked more ahead, and the second search result more dissimilar to the first search result associated with the first provider is ranked more behind. By displaying the second search result based on the similarity, the second search result displayed ahead is more similar to the first search result, thereby improving the efficiency of acquiring information by the user.

In some embodiments, the first terminal acquires attribute information of a currently logged-in account, and the account attribute information indicates a type of a provider matching the account. In an example, the account attribute information is usage preference information, and the usage preference information indicates a type of a preferred provider of the account. The first terminal displays the second search result associated with the at least one second provider based on the account attribute information. The first terminal ranks the second search result in the same way as the server. Refer to step 303 above and this is not repeated herein. For example, the display order of the second search result matching the type indicated by the account attribute information is adjusted to a front position, and the display order of the second search result not matching the type indicated by the account attribute information is adjusted to a back position. The second search result is displayed according to the account attribute information, such as usage preference information, so that the first second search result displayed ahead conforms to the preference of the account, thereby improving the efficiency of acquiring information by the user.

In some embodiments, the first terminal acquires historical search information of the currently logged-in account, where the historical search information indicates a type of a provider associated with a search behavior of the account within a historical period. The first terminal displays the second search result associated with the at least one second provider based on the historical search information. The first terminal ranks the second search result in the same way as the server. Refer to step 303 above and this is not repeated herein. By displaying the second search result based on the historical search behavior of the account, the second search result displayed ahead conforms to the historical search behavior, thereby improving the efficiency of acquiring information by the user.

In some embodiments, the first terminal can further display a third search result associated with at least one third provider in the search results page, where the third provider belongs to a different type from the first provider. The third provider is found by the server based on the type of the first provider and the keyword. For details, refer to step 304 and this is not repeated herein. By displaying the search results associated with providers belonging to different types, the search results are diverse, thereby improving the diversity of information acquisition.

For example, if the type of the first provider is an official account, and the keyword is "looking for a babysitter", the at least one second provider is an official account providing the "looking for a babysitter" service, and the at least one third provider is a webpage and an applet related to "looking for a babysitter". FIG. 5 is a schematic diagram of a search results page according to an embodiment of the present disclosure. Referring to FIG. 5, the first search result associated with the first provider is displayed/pinned at the top of the search results page, and the first search result includes an entry to the official account and an entry to a service related to "looking for a babysitter", that is, by clicking the entry to the service, a babysitter finding service provided by the official account can be directly used. The second search result associated with the second provider is displayed behind the first search result, and the second search result includes an entry to the official account and an entry to a service associated with "looking for a babysitter". The third search result associated with the third provider is displayed behind the second search result. The third search result is a link to a webpage, and the webpage provides a service related to "looking for a babysitter". In some embodiments, the first terminal can further rank the second search result and the third search result based on a display priority, and the ranking manner is not repeated herein.

Figure 6:
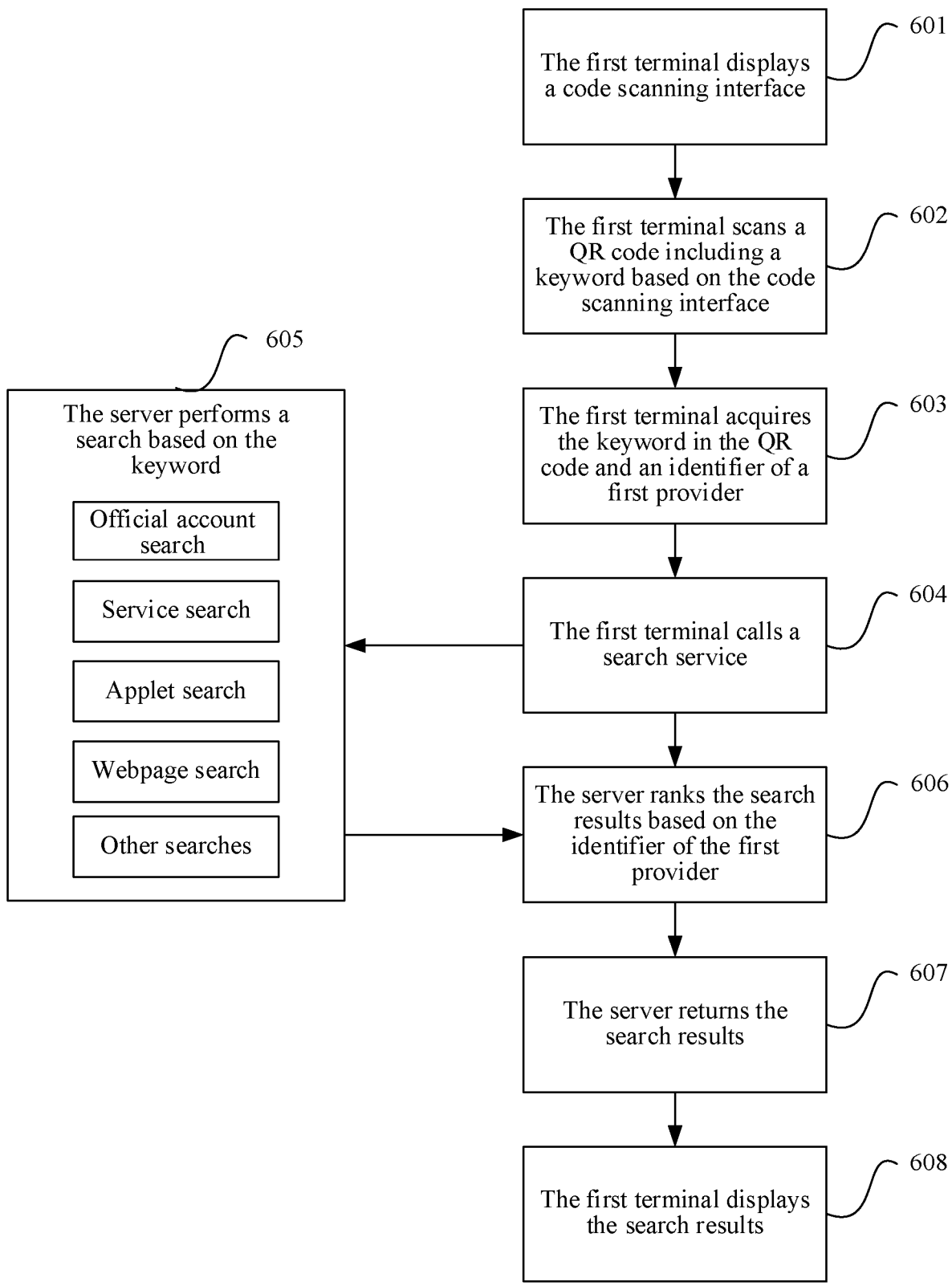
FIG. 6 is a flowchart of another information acquisition method according to an embodiment of the present disclosure.

In order to make the process described in the above steps 301 to 306 easier to understand, FIG. 6 is a flowchart of another information acquisition method according to an embodiment of the present disclosure. Referring to FIG. 6, the method includes the following steps: 601. The first terminal displays a code scanning interface. 602. The first terminal scans a QR code including a keyword based on the code scanning interface. 603. The first terminal acquires the keyword in the QR code and an identifier of a first provider. 604. The first terminal calls a search service. 605. The server performs searches including an official account search, a service search, an applet search, a webpage search, and other searches based on the keyword. 606. The server ranks search results based on the identifier of the first provider. 607. The server returns the search results. 608. The first terminal displays the search results.

According to the technical solutions provided in the present disclosure, the search based on the keyword is triggered by performing the code scanning operation on the target graphic code, so that the second search result of the at least one second provider providing the object associated with the keywords can be found and the first search result of the first provider can also be found. That is, the search results can be obtained by only scanning the target graphic code, and the operation is simple and convenient, thereby improving the efficiency of information acquisition. In addition, because the manner of code scanning search is simple and convenient, users without search habits and search experience can also perform a search conveniently and quickly, thereby expanding the user group of the search function. Moreover, because the results of code scanning search can efficiently deliver high-quality services to users, both service providers and service users are benefited, forming a virtuous circle.

Figure 7:
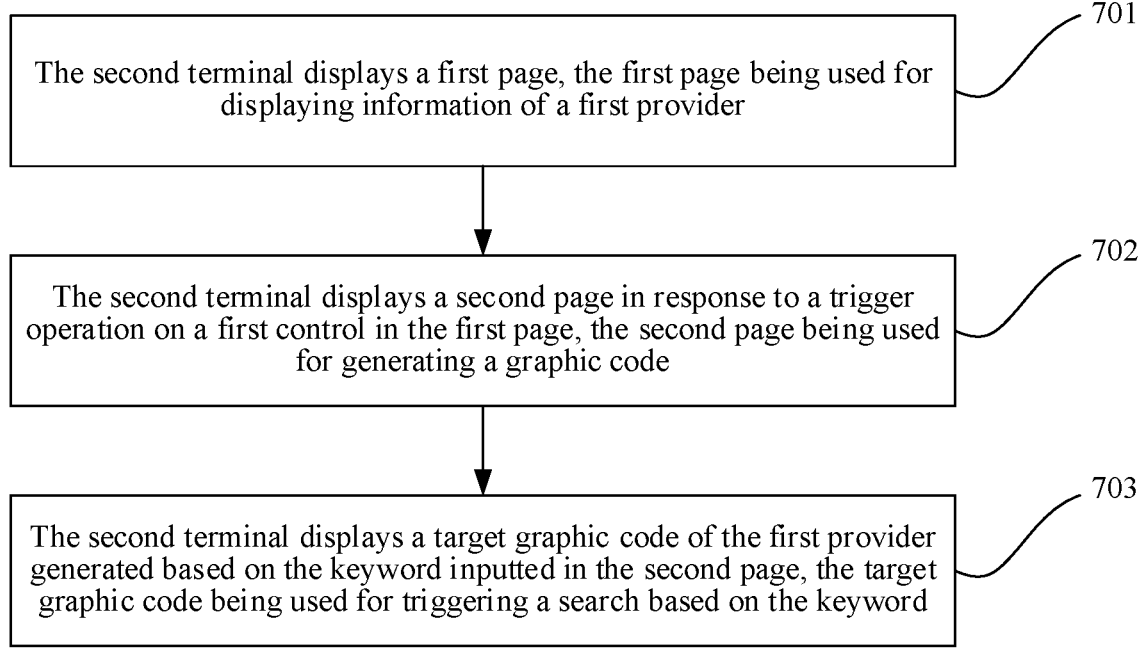
FIG. 7 is a flowchart of a graphic code generation method according to an embodiment of the present disclosure.

FIG. 7 is a flowchart of a graphic code generation method according to an embodiment of the present disclosure. Referring to FIG. 7, the method being performed by a second terminal is used as an example for description in this embodiment of the present disclosure. The method includes the following steps:

701. The second terminal displays a first page, the first page being used for displaying information of a first provider.

In this embodiment of the present disclosure, the second terminal is a terminal associated with the first provider and the second terminal is installed with an application supporting a background management function or can access a background management system. The first page is a background management page for displaying the information of the first provider. If the first page is a background management page of an official account, or the first page is a background management page of an applet, the information of the first provider is an account of the first provider, content published by the first provider, a service provided by the first provider, or the like.

702. The second terminal displays a second page in response to a trigger operation on a first control in the first page, the second page being used for generating a graphic code.

In this embodiment of the present disclosure, the first control is displayed in the first page, and after being triggered, the first control is used for displaying a second page, the second page being used for generating a graphic code. The second page displays an input box, and the input box is used for inputting a keyword.

703. The second terminal displays a target graphic code of the first provider generated based on the keyword inputted in the second page, the target graphic code being configured to trigger a search based on the keyword.

In this embodiment of the present disclosure, the second terminal can acquire the keyword inputted in the second page, acquire the identifier of the first provider, generate a target graphic code capable of providing the keyword and the identifier, and display the target graphic code. In other words, the target graphic code is generated based on the keyword inputted in the second page. After the target graphic code is scanned, the provider of the object associated with the keyword, that is, the first provider, can be searched for. Refer to steps 301 to 304 above and this is not repeated herein.

In some embodiments, a second control is further displayed in the first page, and the second terminal displays a third page in response to a trigger operation on the second control. The third page is used for displaying information such as the number of scanning of the target graphic code, the click-through rate based on the target graphic code, and the like. This is not limited in the embodiments of the present disclosure.

In the technical solutions provided in the present disclosure, by generating the target graphic code including the keyword and the identifier of the first provider, the search results can be obtained by only scanning the target graphic code, and the operation is simple and convenient, thereby improving the efficiency of information acquisition.

Figure 8:
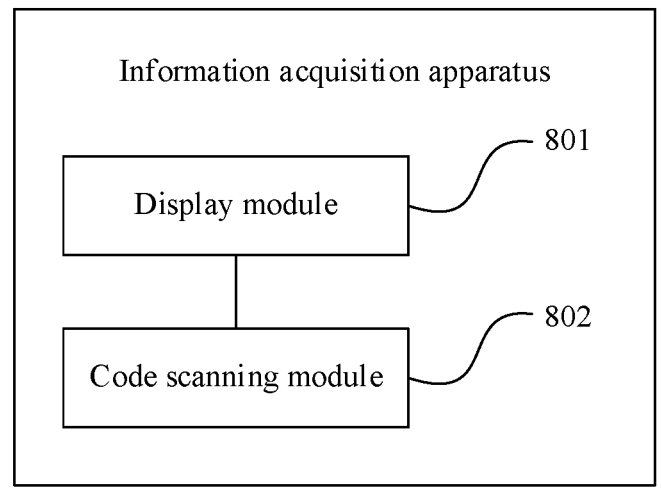
FIG. 8 is a block diagram of an information acquisition apparatus according to an embodiment of the present disclosure.

FIG. 8 is a block diagram of an information acquisition apparatus according to an embodiment of the present disclosure. The apparatus is configured to perform the steps in the above information acquisition method. Referring to FIG. 8, the apparatus includes a display module 801 and a code scanning module 802.

The display module 801 is configured to display a code scanning interface.

The code scanning module 802 is configured to perform a code scanning operation on a target graphic code of a first provider based on the code scanning interface, the target graphic code being configured to trigger a search based on a keyword;

The display module 801 is further configured to display a first search result associated with the first provider and a second search result associated with the at least one second provider in a search results page for the keyword, the second provider being used for providing an object associated with the keyword.

In some embodiments, the display module 801 is configured to pin the first search result associated with the first provider at the top of the search results page.

In some embodiments, the display module 801 is configured to display the second search result associated with the at least one second provider based on a display priority of the at least one second provider.

In some embodiments, the display module 801 is configured to display the second search result associated with the at least one second provider based on a similarity between the at least one second provider and the first provider.

In some embodiments, the display module 801 is configured to obtain attribute information of a currently logged-in account, where the attribute information indicates a type of a provider matching the account; and display the second search result associated with the at least one second provider based on the account attribute information.

In some embodiments, the display module 801 is configured to obtain historical search information of a currently logged-in account, where the historical search information indicates a type of a provider associated with a search behaviors of the account in a historical time period; and display the second search result associated with the at least one second provider based on the historical search information.

In some embodiments, the display module 801 is further configured to display a third search result associated with at least one third provider, where the third provider belongs to a different type from the first provider.

In some embodiments, search results displayed in the search results page include at least one of the following:
- an entry to an official account and an entry to an object associated with the keyword in the official account;
- an entry to an applet;
- a link to a multimedia resource; and
- a link to a webpage.

In some embodiments, the target graphic code is any one of a barcode, a QR code, or an applet code.

According to the technical solutions provided in the present disclosure, the search based on the keyword is triggered by performing the code scanning operation on the target graphic code, so that the second search result of the at least one second provider providing the object associated with the keywords can be found and the first search result of the first provider can also be found. The search results can be obtained by only scanning the target graphic code, and the operation is simple and convenient, thereby improving the efficiency of information acquisition.

When the information acquisition apparatus provided in the foregoing embodiments obtains information, only division of the foregoing function modules is described by using an example. During actual application, the foregoing functions may be allocated to and completed by different function modules according to requirements. That is, an internal structure of the device is divided into different function modules, to complete all or some of the foregoing functions described. In addition, the information acquisition apparatus and the information acquisition method embodiments provided in the foregoing embodiments belong to the same conception. For the specific implementation process, reference may be made to the method embodiments, and details are not repeated herein.

Figure 9:
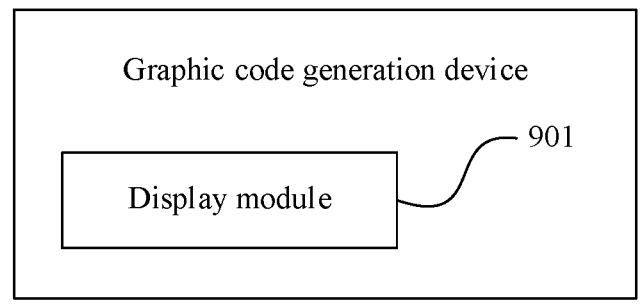
FIG. 9 is a block diagram of a graphic code generation apparatus according to an embodiment of the present disclosure.

FIG. 9 is a block diagram of a graphic mode generation apparatus according to an embodiment of the present disclosure. The apparatus is configured to perform the steps in the above graphic code generation method. Referring to FIG. 9, the apparatus includes a display module 901.

The display module 901 is configured to display a first page, the first page being used for displaying information of a first provider.

The display module 901 is further configured to display a second page in response to a trigger operation on a first control in the first page, the second page being used for generating a graphic code.

The display module 901 is further configured to display a target graphic code of the first provider, the target graphic code being generated based on a keyword inputted on the second page, and the target graphic code being configured to trigger a search based on the keyword.

In the technical solutions provided in the present disclosure, by generating the target graphic code including the keywords and the identifier of the first provider, the search results can be obtained only by scanning the target graphic code, where the operation is simple and convenient, thereby improving the efficiency of information acquisition.

When the graphic code generation apparatus generates a graphic code, the foregoing embodiment is merely described by using an example of dividing various functional modules. In actual application, the foregoing function allocation is completed by different functional modules according to needs, that is, the internal structure of the apparatus is divided into different functional modules, to complete all or some of functions described above. The module may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. In addition, the graphic code generation apparatus and graphic code generation method embodiments provided in the foregoing embodiments belong to the same conception. For the specific implementation process, reference may be made to the method embodiments, and details are not repeated herein.

Figure 10:
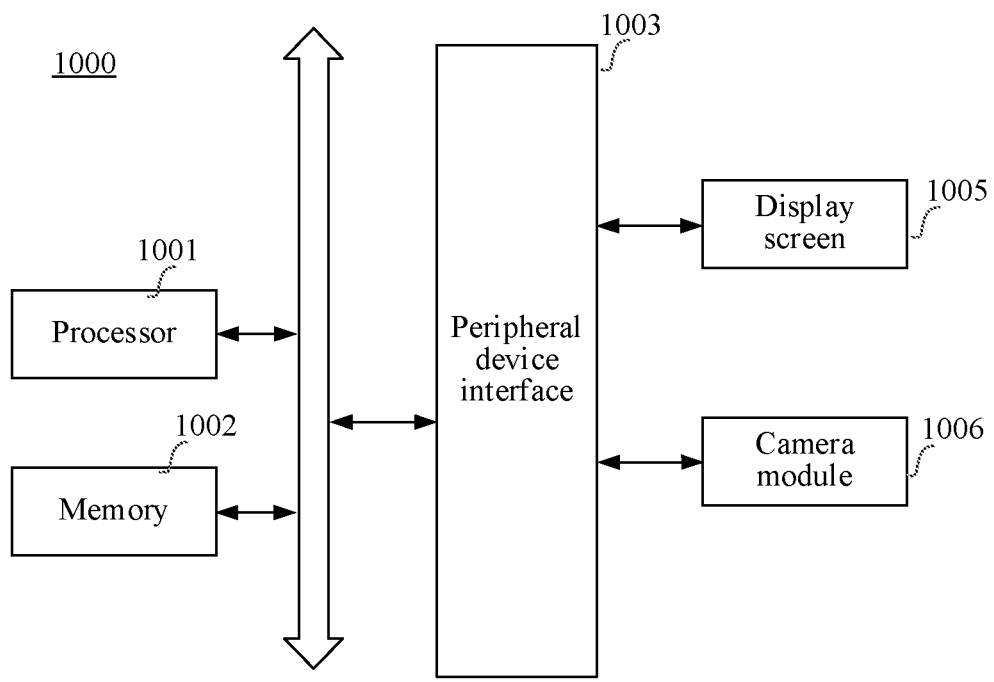
FIG. 10 is a structural block diagram of a terminal according to an embodiment of the present disclosure.

FIG. 10 is a structural block diagram of a terminal according to an embodiment of the present disclosure. The terminal 1000 is a portable mobile terminal, such as a smartphone, a tablet computer, a moving picture experts group audio layer III (MP3) player, a moving picture experts group audio layer IV (MP4) player, a notebook computer, or a desktop computer. The terminal 1000 may also be referred to as other names such as user equipment, a portable terminal, a laptop terminal, or a desktop terminal.

Usually, the terminal 1000 includes a processor 1001 and a memory 1002.

The processor 1001 includes one or more processing cores, such as a 4-core processor or an 8-core processor. The processor 1001 is implemented by using at least one hardware form of a digital signal processor (DSP), a field-programmable gate array (FPGA), and a programmable logic array (PLA). In some embodiments, the processor 1001 includes a main processor and a coprocessor. The main processor is a processor configured to process data in an active state, also referred to as a central processing unit (Central Processing Unit, CPU). The coprocessor is a low-power consumption processor configured to process data in a standby state. In some embodiments, the processor 1001 is integrated with a graphic processing unit (GPU). The GPU is configured to render and plot what needs to be displayed on a display screen.

The memory 1002 further includes one or more computer-readable storage media. The computer-readable storage media is non-transitory. The memory 1002 further includes a high-speed random access memory, as well as non-volatile memory, such as one or more disk storage devices and flash storage devices. In some embodiments, the non-transient computer-readable storage medium in the memory 1002 is configured to store at least one computer program, and the at least one computer program is configured to be executed by the processor 1001 to implement the information acquisition method or the graphic code generation method provided in the method embodiments of the present disclosure.

In some embodiments, the terminal 1000 may further include: a peripheral device interface 1003 and at least one peripheral device. The processor 1001, the memory 1002, and the peripheral device interface 1003 are connected by using a bus or a signal cable. Each peripheral device may be connected to the peripheral device interface 1003 by using a bus, a signal cable, or a circuit board. In some embodiments, the peripheral device includes a display screen 1005 and a camera assembly 1006.

The peripheral interface 1003 may be configured to connect at least one input/output (I/O)-related peripheral to the processor 1001 and the memory 1002. In some embodiments, the processor 1001, the memory 1002, and the peripheral device interface 1003 are integrated on the same chip or circuit board. In some other embodiments, any one or two of the processor 1001, the memory 1002, and the peripheral device interface 1003 are implemented on an independent chip or circuit board, which is not limited in this embodiment.

The display screen 1005 is configured to display a user interface (UI). The UI includes a graph, a text, an icon, a video, and any combination thereof. When the display screen 1005 is a touch display screen, the display screen 1005 also has the ability to collect a touch signal at or above the surface of the display screen 1005. The touch signal is inputted, as a control signal, to the processor 1001 for processing. In this case, the display screen 1005 is also configured to provide virtual buttons and/or virtual keyboards, also referred to as soft buttons and/or soft keyboards. In some embodiments, one display screen 1005 is disposed on the front panel of the terminal 1000. In some other embodiments, at least two display screens 1005 are disposed on a different surface of the terminal 1000 or in a folded design. In some other embodiments, the display screen 1005 is a flexible display screen disposed on a curved surface or folded surface of the terminal 1000. Even further, the display screen 1005 is disposed in a non-rectangular irregular pattern, that is, a special-shaped screen. The display screen 1005 is prepared by using materials such as a liquid crystal display (LCD), an organic light-emitting diode (OLED), or the like.

The camera assembly 1006 is configured to capture an image or a video. In some embodiments, the camera assembly 1006 includes a front camera and a rear camera. Generally, the front-facing camera is arranged on a front panel of the terminal, and the rear-facing camera is arranged on a rear surface of the terminal. In some embodiments, there are at least two rear-facing cameras, each being any one of a main camera, a depth-of-field camera, a wide-angle camera, and a telephoto camera, to achieve a background blurring function through fusion of the main camera and the depth-of-field camera, panoramic photo shooting and virtual reality (VR) shooting functions through fusion of the main camera and the wide-angle camera, or another fusion shooting function. In some embodiments, the camera assembly 1006 further includes a flash. The flash is a single color temperature flash or a double color temperature flash. The double color temperature flash refers to a combination of a warm light flash and a cold light flash, and is used for light compensation under different color temperatures.

A person skilled in the art understand that the structure shown in FIG. 10 does not constitute a limitation to the terminal 1000, and the terminal includes more or fewer components than those shown in the figure, or some components may be combined, or a different component arrangement may be used.

An embodiment of the present disclosure further provides a computer-readable storage medium. The computer-readable storage medium stores at least one computer program, the at least one computer program being loaded and executed by a processor to implement the operations in the information acquisition method in the foregoing embodiments, or the operations performed by the terminal in the graphic code generation method. For example, the computer-readable storage medium is a read-only memory (ROM), a random access memory (random-access memory, RAM), a compact disc read-only memory (CD-ROM), a magnetic tape, a floppy disk, an optical data storage device, and the like.

An embodiment of the present disclosure further provides a computer program product or a computer program. The computer program product or the computer program includes a computer program code, the computer program code being stored in a computer-readable storage medium. A processor of a terminal reads the computer program code from the computer-readable storage medium, and the processor executes the computer program code, to cause the terminal to perform the information acquisition method or the graphic code generation method provided in the foregoing example implementations.

A person of ordinary skill in the art understand that all or some of the steps of the foregoing embodiments are implemented by hardware, or are implemented by a program instructing relevant hardware. The program is stored in a computer-readable storage medium. The storage medium is a read-only memory, a magnetic disk, an optical disc, or the like.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An information acquisition method, performed by a first terminal, the method comprising:
    displaying a code scanning interface of a social application executed on the first terminal;
    performing a code scanning operation on a target graphic code of a first provider based on the code scanning interface, the target graphic code being configured to trigger a search based on a keyword and an identifier of the first provider;
    generating and transmitting, by the social application, a search request to a server, the search request containing the keyword and the identifier of the first provider obtained from the target graphic code of the first provider, the server being coupled to the social application; and
    receiving from the server and displaying a search results page in the social application that lists a first search result associated with the first provider and a second search result associated with at least one second provider, the first provider and the at least one second provider being different information carriers that provide contents associated with the keyword, and the first search result being ranked higher than the second search result on the search results page.

2. The method according to claim 1, wherein the displaying a first search result associated with a first provider comprises:
    pinning the first search result associated with the first provider to a top of the search results page.

3. The method according to claim 1, wherein the displaying a second search result associated with at least one second provider comprises:

displaying the second search result associated with the at least one second provider based on a display priority of the at least one second provider.

4. The method according to claim 1, wherein the displaying a second search result associated with at least one second provider comprises:
displaying the second search result associated with the at least one second provider based on a similarity between the at least one second provider and the first provider.

5. The method according to claim 1, wherein the displaying a second search result associated with at least one second provider comprises:
displaying the second search result associated with the at least one second provider based on account attribute information of a currently logged-in account, wherein the account attribute information indicates a type of a provider matching the account.

6. The method according to claim 1, wherein the displaying a second search result associated with at least one second provider comprises:
displaying the second search result associated with the at least one second provider based on historical search information of a currently logged-in account, wherein the historical search information indicates a type of a provider associated with a search behavior of the account within a historical time period.

7. The method according to claim 1, further comprising:
displaying a third search result associated with at least one third provider in the search results page, wherein the third provider belongs to a different type from the first provider.

8. The method according to claim 1, wherein search results displayed in the search results page comprise at least one of:
an entry to an official account and an entry to an object associated with the keyword in the official account;
an entry to an applet;
a link to a multimedia resource; and
a link to a webpage.

9. The method according to claim 1, wherein the target graphic code is any one of a barcode, a QR code, or an applet code.

10. The method according to claim 1, wherein the second provider provides an object associated with the keyword.

11. The method according to claim 1, wherein the first search result includes an entry to an official account of the first provider in the social application and an entry to an object associated with the keyword in the official account.

12. The method according to claim 1, wherein the first search result includes an entry to an applet of the first provider in the social application.

13. The method according to claim 1, wherein the target graphic code of the first provider is generated based on a background management function supported by a service provider of the social application.

14. An information acquisition apparatus, comprising:
at least one processor and at least one memory, the at least one memory being configured to store at least one computer program, and the at least one computer program being loaded and executed by the at least one processor to implement:
displaying a code scanning interface of a social application executed on the information acquisition apparatus;
performing a code scanning operation on a target graphic code of a first provider based on the code scanning interface, the target graphic code being configured to trigger a search based on a keyword and an identifier of the first provider;
generating and transmitting, by the social application, a search request to a server, the search request containing the keyword and the identifier of the first provider, the server being coupled to the social application; and
receiving from the server and displaying a search results page in the social application that lists a first search result associated with the first provider and a second search result associated with at least one second provider, the first provider and the at least one second provider being different information carriers that provide contents associated with the keyword, and the first search result being ranked higher than the second search result on the search results page.

15. The apparatus according to claim 14, wherein the displaying a first search result associated with a first provider comprises:
pinning the first search result associated with the first provider to a top of the search results page.

16. The apparatus according to claim 14, wherein the displaying a second search result associated with at least one second provider comprises:
displaying the second search result associated with the at least one second provider based on a display priority of the at least one second provider.

17. The apparatus according to claim 14, wherein the displaying a second search result associated with at least one second provider comprises:
displaying the second search result associated with the at least one second provider based on a similarity between the at least one second provider and the first provider.

18. The apparatus according to claim 14, wherein the displaying a second search result associated with at least one second provider comprises:
displaying the second search result associated with the at least one second provider based on account attribute information of a currently logged-in account, wherein the account attribute information indicates a type of a provider matching the account.

19. The apparatus according to claim 14, wherein the target graphic code is any one of a barcode, a QR code, or an applet code.

20. A non-transitory computer-readable storage medium, configured to store at least one computer program, the at least one computer program, when being executed by at least one processor of a first terminal, causing the at least one processor to perform:
displaying a code scanning interface of a social application executed on the first terminal;
performing a code scanning operation on a target graphic code of a first provider based on the code scanning interface, the target graphic code being configured to trigger a search based on a keyword and an identifier of the first provider;
generating and transmitting, by the social application, a search request to a server, the search request containing the keyword and the identifier of the first provider, the server being coupled to the social application; and
receiving from the server and displaying a search results page in the social application that lists a first search result associated with the first provider and a second search result associated with at least one second provider, the first provider and the at least one second provider being different information carriers that provide contents associated with the keyword, and the first search result being ranked higher than the second search result on the search results page.

\* \* \* \* \*